Aug. 9, 1966    C. R. LARSON ETAL    3,265,189
BUCKET CONVEYORS
Filed Sept. 8, 1964    3 Sheets-Sheet 1
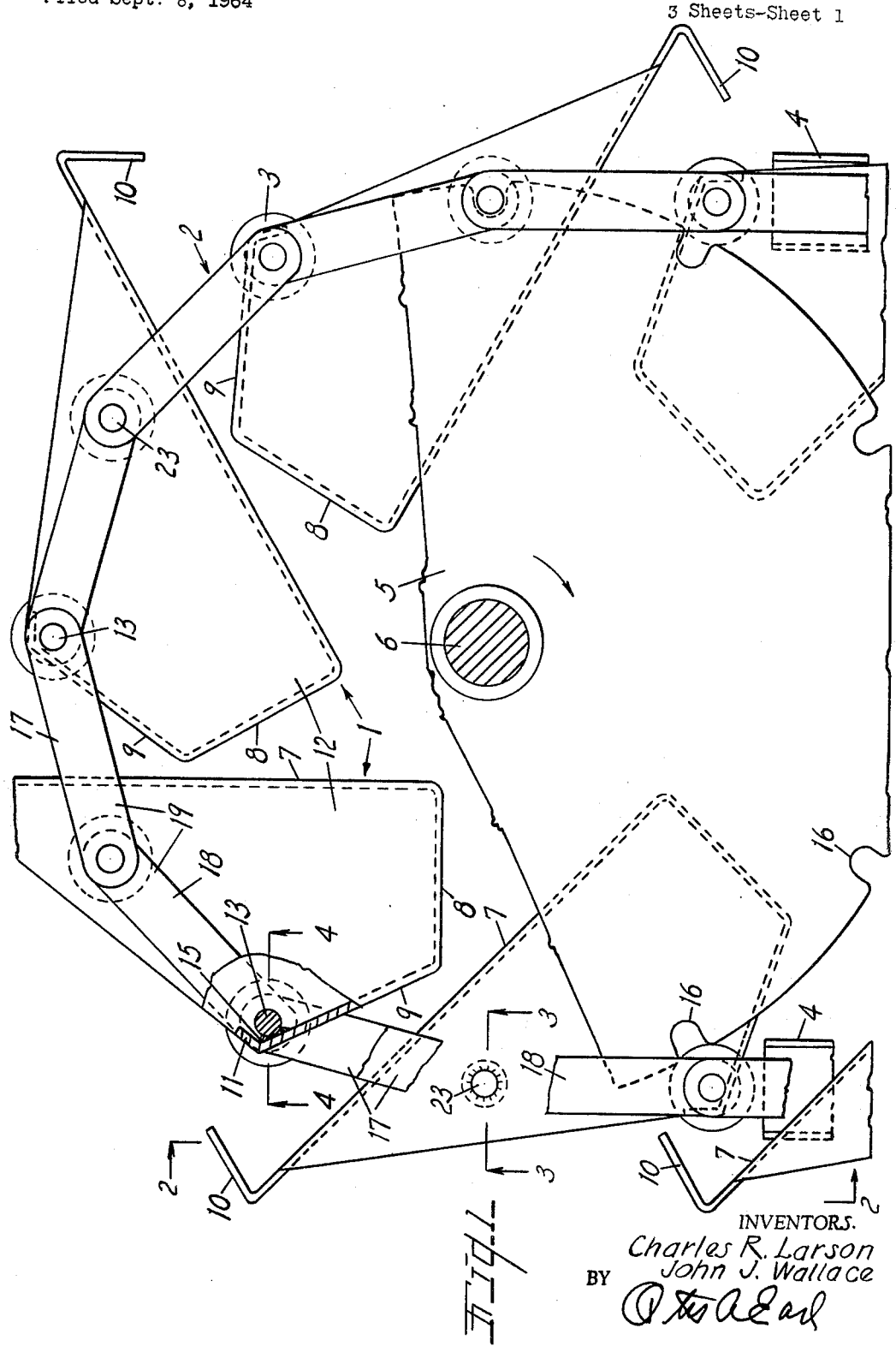
INVENTORS.
Charles R. Larson
John J. Wallace
BY
ATTORNEY.

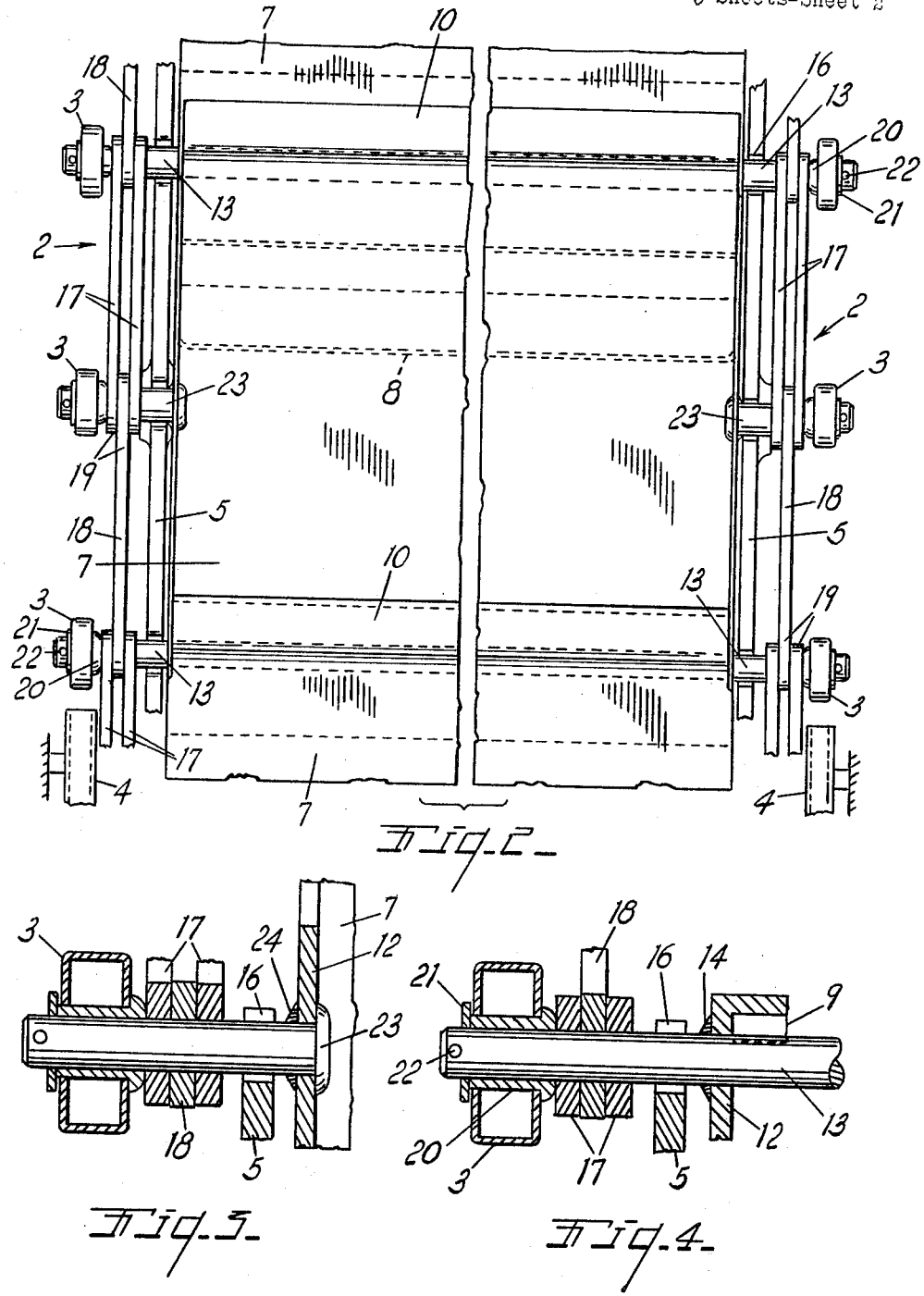

Aug. 9, 1966 C. R. LARSON ETAL 3,265,189
BUCKET CONVEYORS
Filed Sept. 8, 1964 3 Sheets-Sheet 3
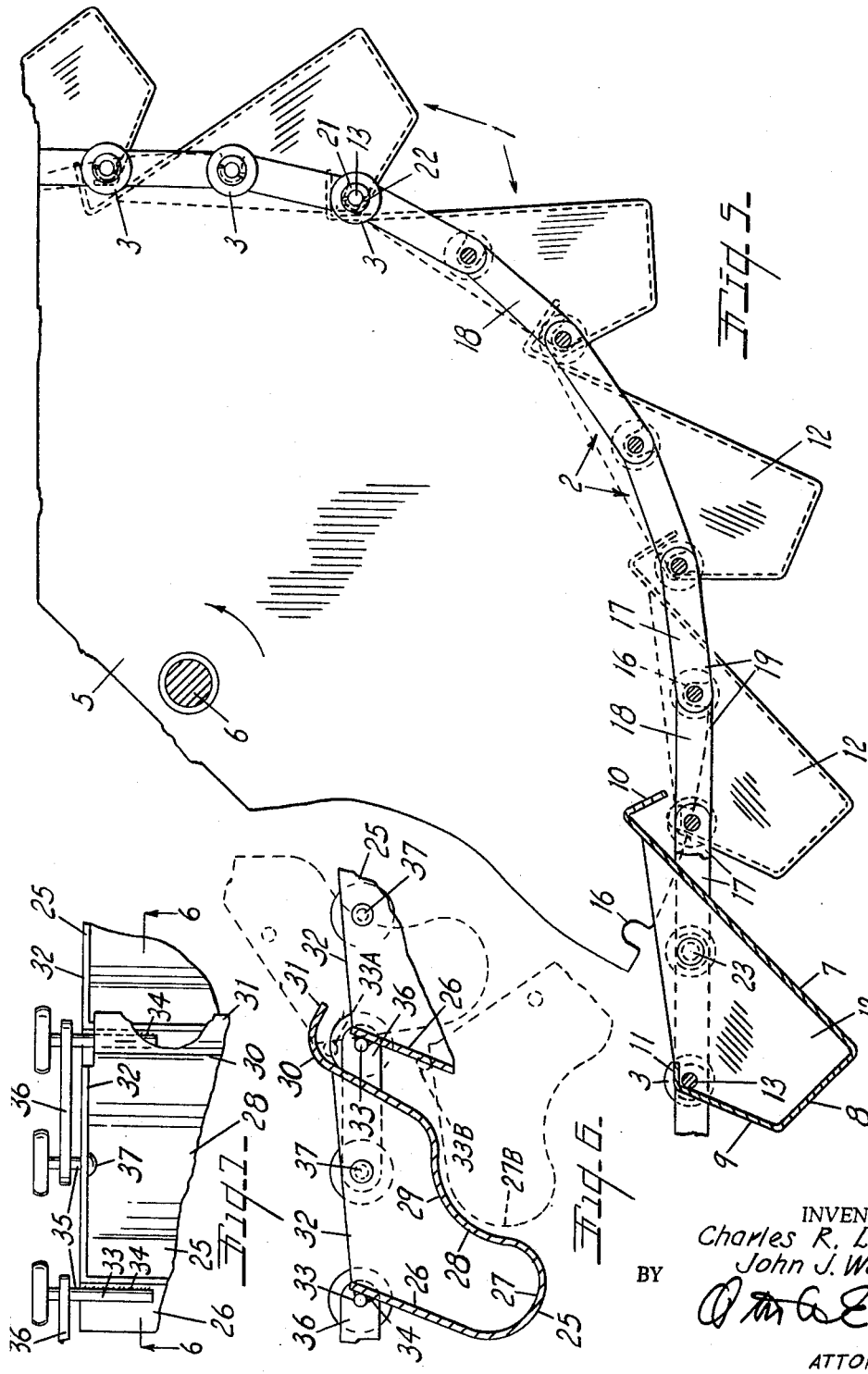
INVENTORS.
Charles R. Larson
John J. Wallace
BY
ATTORNEY.

United States Patent Office 3,265,189
Patented August 9, 1966

1

3,265,189
BUCKET CONVEYORS
Charles R. Larson, 532 Capital, Bellevue, Mich., and John
J. Wallace, 5131 Maple Ridge Drive, Kalamazoo, Mich.
Filed Sept. 8, 1964, Ser. No. 394,889
10 Claims. (Cl. 198—149)

This invention relates to improvements in bucket conveyors. The principal objects of this invention are:

First, to provide a bucket conveyor in which the adjacent edges of successive buckets are overlapped so that material may be deposited into the conveyor in a continuous stream and fall into one or another of the advancing buckets without falling between the buckets.

Second, to provide a bucket conveyor with overlapping adjacent buckets in which material delivered to the buckets and discharged therefrom cannot fall or work its way into any moving parts which will cause wear and failure of the conveyor advancing mechanism.

Third, to provide a bucket conveyor having the overlapping buckets described in which the buckets may be adapted for handling solid or liquid materials.

Fourth, to provide a bucket conveyor which is capable of advancing materials in either vertical or horizontal reaches and which can be moved in concave or convex turns relative to the upper open sides of the buckets without spilling material from the buckets.

Fifth, to provide a bucket conveyor having overlapping buckets of substantial capacity in either horizontal or vertical movement of the buckets.

Sixth, to provide a bucket conveyor having the foregoing characteristics in which the ends of the buckets may form part of the conveyor chain thus reducing the cost of the conveyor without reducing the strength and long life of the conveyor.

Seventh, to provide a bucket conveyor having overlapping edges between adjacent buckets, in which the buckets are supported at spaced points or along a line along the converging chain so as not to swing or rock uncontrollably on the chain but able to swing smoothly from horizontally to vertically aligned upright positions.

Other objects and advantages of the invention will be apparent from a consideration of the following description and claims. The drawings, of which there are three sheets, illustrate two highly practical forms of the conveyor.

FIG. 1 is a fragmentary side elevational view partially in section of one embodiment of my invention.

FIG. 2 is a fragmentary elevational view on a line corresponding to line 2—2 of FIG. 1.

FIG. 3 is an enlarged fragmentary view partially in section on a line corresponding to line 3—3 of FIG. 1.

FIG. 4 is a fragmentary view partially in section on a line corresponding to line 4—4 of FIG. 1 illustrating details for the connections of the buckets or receptacles to the conveyor chains.

FIG. 5 is a fragmentary side elevational view partially in section illustrating the conveyor of FIGS. 1-4 and showing further structural details of the receptacles and their relation to each other.

FIG. 6 is a fragmentary view partially in section of a modified form of conveyor.

FIG. 7 is a fragmentary top view of the modified form of a conveyor illustrated in FIG. 6.

Bucket conveyors consisting of adjacent buckets pivoted on conveyor chains and having edges on the buckets that overlap have been known but the buckets of these prior conveyors either swing on single individual pivot axes or have adjacent edges connected by hinges that are exposed to the material being conveyed. As a result there is no overlap on vertical reaches and the buckets tend to rock uncontrollably and sometimes overturn or the hinges wear rapidly when exposed to abrasive material. The present invention provides buckets and conveyor connections that overcome these conditions.

The form of the conveyor illustrated in FIGS. 1 to 5 consists of a plurality of successive buckets indicated generally by the numeral 1. The buckets are connected by a pair of link chains indicated generally at 2 and positioned at the ends of the buckets. The chains are provided with rollers 3 which may be guidingly or supportingly received in guide rails 4 and the chains are trained around suitable sprocket wheels 5 mounted on shafts 6 for driving or guiding the conveyor.

The conveyor will operate in either direction but for the purposes of description the conveyor will be considered as advancing in a clockwise direction as indicated by the arrow in FIG. 1 and in counterclockwise direction as indicated by the arrow in FIG. 5. With this orientation of the buckets in mind each bucket consists of a leading side wall 7 connecting to a bottom wall 8 which is in turn connected to a trailing side wall 9. At its outer edge the wall 7 is provided with a forwardly and downwardly turned flange 10 which overhangs the rear wall of the preceding bucket in both the horizontal and vertical reaches of the conveyor as is illustrated in the drawings. The rear wall 9 is provided at its upper edge with a forwardly turned flange 11 which is generally vertical in the vertical reaches of the conveyor to increase the holding capacity of each bucket. The transverse length of the buckets can be of any desired length depending on the strength of the material in the walls of the bucket. The ends of the buckets are closed by end walls 12 which may be integral with the side and bottom walls and which extend from the outer upper edge of the trailing walls 9 and the flange 10 to just below the outer edges of the leading walls 7. The leading walls 7 are approximately three times as wide as the trailing walls 9. The bottom walls of the buckets in the first example illustrated are flat, but as is apparent from a consideration of the modified bucket in FIGS. 6 and 7 the contour of the bottom wall 8 may be varied considerably as desired.

Secured to the leading inner side of the trailing walls 9 just below the flanges 11 are a series of transverse pivot bars 13 which project through the end walls 12 and are secured thereto by welding as at 14 in FIG. 4. The bars may be further welded to the trailing walls 9 by welding as at 15 in FIG. 1. The pivot bars 13 project transversely or laterally from the ends of the conveyor buckets and have a portion engageable in slots or teeth 16 in the sprocket wheels 5 as shown in FIGS. 1 and 4. Laterally outwardly from the sprocket engaging portion, the pivot bars connect the dual link bars 17 of one pair of links in the chains 2 to single link bars 18 of another pair of links of the chain. The chain may be considered as being made up of successive pairs of links indicated at 19 in FIGS. 1 and 5. Outwardly from the chains 2 the pivot bars 13 are provided with suitable bushings 20 for the rollers 3 which are retained on the ends of the pivot bars by thrust washers 21 and retaining pins 22 or by any suitable roller to pivot mounting.

Secured to the end walls 12 as by being passed therethrough are headed pivot pins 23 which are secured to the end walls by welding as at 24 in FIG. 3 and which project transversely or laterally from the ends of the buckets for engagement with the slots 16 of the sprocket wheels 5. Outwardly from the sprocket engaging portion the pivot pins pivotally connect the ends of dual links 17 to the end of a single link 18 of one of the pairs of links 19 of the conveyor chains. Outwardly from the chains the pivot pins 23 are provided with rollers 3 the same as the ends of the pivot bars 13. The pivot pins 23 are secured to the end walls 12 adjacent the outer or upper edges of the end walls but somewhat below the upper edges and more closely adjacent to the leading walls 7 than they are to the trailing walls 9. The length of the links 18 and 19 of each pair are equal between their pivot connections so that the pivots 19 and 23 of the conveyor chains are equally spaced as are the slots 16 in the sprocket wheels for receiving and driving or guiding the pivots and the chain.

Alternatively, both the pivot bars 13 and pins 23 may be secured to the outside of the end walls and the sprockets may receive the rollers 3 directly in notches similar to slots 16 but enlarged as will be understood.

As appears most clearly from FIG. 5 the forwardly turned flange 10 of each bucket overlies the forwardly turned flange 11 of the preceding bucket in both vertically and horizontally spaced relation so that material discharged vertically into a horizontal reach of the conveyor will fall either into one bucket or an adjacent bucket with the flow of material being diverted between the buckets by the bend of the flanges 10. The position of the pivots 13 and 23 along horizontal reaches of the conveyor support the buckets with the walls in inclined relation. As the buckets and chains advance around a concave curve as in FIG. 5, the trailing pivot bars 13 of the leading bucket move upwardly into the angle formed by the leading wall 7 and flange 10 of the following bucket. The buckets swing in passing around the curve until the leading wall is generally vertical and the forwardly turned flange on the trailing edge is generally vertical and closely adjacent the leading wall of the following bucket. The flange 11 thus functions to increase the carrying capacity of the bucket in vertical reaches of the conveyor.

As the buckets and conveyor move from a vertical reach around a convex sprocket or curve as shown in FIG. 1 each leading bucket is moved away from its following bucket so that the trailing pivot 13 of the leading bucket moves away from the angle of the leading wall 7 and flange 10 of the trailing bucket. The obtuse angle between the line of pivots and the trailing wall of each bucket cause the trailing wall to move inwardly along and spaced from the inclined wall of the trailing bucket so that there is no interference between the buckets in passing around the convex curve. As each leading wall swings to a vertical position the trailing wall swings through a vertical position to a forwardly inclined position as at the top of FIG. 1. As the buckets swing downwardly around a convex curve as in FIG. 1 the leading walls 7 are inclined downwardly in a bucket discharging position and it will be noted that the generally planar character of the leading walls assures free and complete discharge of the material in the buckets.

The modified form of conveyor shown in FIGS. 6 and 7 is provided with buckets 25 having generally planar trailing walls 26 connected by a curved bottom wall 27 which is in turn connected to an irregular leading wall 28 having an inwardly curved recess 29 and provided with a reversely curved outer lip 30 and forwardly turned flange 31. End walls 32 corresponding to the contour of the bucket walls close the ends of the buckets.

The rear or trailing pivot bars 33 are short bars welded to the trailing outer sides of the trailing walls 26 as at 34. The pivot bars project laterally beyond the ends of the buckets but do not necessarily extend completely across the length of the buckets. Outwardly from the ends of the buckets the pivot bars 33 are provided with exposed areas 35 engageable with the sprockets of the conveyor and at their outer ends are provided with rollers 3 as in the first form of the conveyor. The pivot bars 33 pivotally connect to one end of a single link 36 forming part of the conveyor chain as will be described.

Spaced from the trailing walls 26 and secured to the end walls 32 are pivot pins 37 essentially the same as the pivot pins 23. The pins 37 pivotally connect to the trailing ends of the link bars 36 from the preceding bucket so that the end wall of the bucket performs the chain forming or completing functions of the single links 18 of the chains in the first form of the conveyor.

As the modified conveyor in FIG. 6 moves around a concave turn or sprocket, the trailing pivot bars 33 of leading buckets move upwardly to the position shown at 33A in dotted lines within the concave lip 30 at the leading side of the trailing bucket so that there is no interference between the buckets. As the conveyor moves around a convex curve from a horizontal reach the trailing pivot bars 33 move downwardly to a position indicated by the dotted lines at 33B and the bottom wall swings to a rearwardly displaced position indicated by the dotted lines at 27B. The reentrant curve 29 in the leading wall of the trailing bucket provides clearance for the swinging lower end of the preceding bucket.

The modified shape of bucket in FIG. 6 will discharge in either direction but is particularly adapted to discharge along the planar trailing wall 26 which is not obstructed by a forwardly turned flange such as the flange 11 in the first form of the conveyor. Both forms of the conveyor protect and bridge the space between the buckets by the forwardly turned flanges 10 and 31 so that the conveyor may be loaded by passing a horizontal reach of the conveyor below a continuously delivering spout for the material to be conveyed. No part of the bucket portion of the conveyor includes any relatively movable bearing parts so there are no parts to become abraded and worn by material carried by the conveyor. The rollers 3 and the pivotal connections to the conveyor chain links are all displaced laterally beyond the ends of the conveyor and may be easily protected at loading or discharge points so there is no accumulation of dust or abrasive on the moving parts of the conveyor chains. Both forms of the conveyor are accordingly extremely long lived.

In both forms of the conveyor, each bucket is supported at two longitudinally spaced points along the length of the conveyor and at both ends of the buckets. The buckets are accordingly stable while moving along both horizontal and vertical reaches of the conveyor. It is a characteristic of the conveyor that the pitch of the buckets, that is, the distance from one point such as the rear edge of one bucket to the rear edge of the next bucket, is at least two even multiples of the pitch of the conveyor or the distance between the axes of two adjacent rollers. The pitch of the rollers throughout the conveyor must be equal to coact with equal spacing of the notches in the sprockets. The pitch of the buckets must accordingly be uniform and an integral multiple greater than one of the pitch of the conveyor rollers or link pivots.

The length of the buckets from the trailing side to the leading side of the downturned flange must be somewhat greater than the assembled pitch of the buckets to provide for the overlap of the flanges 10 and 31. The cross sectional shape of the buckets may be varied depending on the radius of the sprockets, so long as the top of the leading side and the downturned flange 10 or 31 is sufficiently above the plane of the pivots 13–23 or 33–37 to clear the trailing edge of the preceding bucket displaced by one pitch of the sprocket teeth. The lower trailing portion of the bucket must be sized and spaced from the trailing pivot 13 or 33 to clear the intermediate portion of the front or leading wall of a following bucket when the conveyor passes concavely inwardly or downwardly from a horizontal reach.

Two highly practical forms of the conveyor have been disclosed but the invention is not limited to these specific forms as variations thereof may be made without departing from the theory of the invention as defined in the following claims.

What is claimed as new is:
1. A bucket conveyor comprising:
a pair of laterally spaced link chains,
pivot pins connecting adjacent ends of successive pairs of links of each of said chains and extending laterally inwardly therefrom, rollers mounted on said pivot pins, a plurality of buckets extending transversely between said chains and having lateral end walls with transverse leading, bottom and trailing walls extending between the edges of the end walls, said pivot pins being secured to said end walls near the upper edges thereof at approximately two-thirds of the distance from the trailing wall to the leading wall, other pivots consisting of bars extending through said end walls adjacent the upper trailing corners thereof and across said buckets and therebeyond into pivotal connecting engagement with said pairs of links, other rollers on said other pivots, first flanges turned from the outer edges of said trailing walls in leading overhanging relation to the pivot bars at the trailing sides of said buckets, other flanges turned from the outer edges of said leading walls in overhanging upwardly spaced relation to the first flange on the preceding bucket, and at least one driven shaft having sprockets thereon with peripheral radial slots successively receiving successive pivot pins and said other pivots in conveyor driving engagement, said leading walls being approximately three times as long as said bottom walls and at about 45° from the plane of the pivots connected to its own bucket, said trailing walls being about one-third the height of said leading walls.

2. A bucket conveyor comprising:

a pair of laterally spaced link chains, pivot pins connecting adjacent ends of successive pairs of links of each of said chains and extending laterally inwardly therefrom, a plurality of buckets extending transversely between said chains and having lateral end walls with transverse leading, bottom and trailing walls extending between the edges of the end walls, said pivot pins being secured to said end walls near the upper edges thereof at points spaced between the trailing walls and the leading wall, other pivots connected to said end walls adjacent the upper trailing corners thereof and extending therebeyond into pivotal connecting engagement between the ends of said pairs of links, first flanges turned from the outer edges of said trailing walls in leading overhanging relation to the trailing sides of said buckets, other flanges turned from the outer edges of said leading walls in overhanging upwardly spaced relation to the first flange on the preceding bucket, and at least one driven shaft having sprockets thereon with peripheral radial slots successively receiving successive pivot pins and said other pivots in conveyor driving engagement, said leading walls being approximately planar from three times said bottom walls to said other flanges, said trailing walls being of lesser height than said leading walls and extending in rearwardly diverging relation to said leading walls.

3. A bucket conveyor comprising:

a pair of laterally spaced link chains, pivot pins connecting adjacent ends of successive separate pairs of links of each of said chains and extending laterally inwardly therefrom, a plurality of buckets extending transversely between said chains and having lateral end walls with transverse leading, bottom and trailing walls extending between the end walls, said pivot pins being secured to said end walls near the upper edges thereof in spaced relation from the trailing wall, other pivots connected to said buckets adjacent the upper trailing corners thereof and extending therebeyond into pivotal connecting engagement between the ends of said pairs of links, flanges turned from the outer edges of said leading walls in overhanging upwardly spaced relation to the trailing side of the preceding bucket, and at least one pair of driven sprockets with peripheral radial slots successively receiving successive pivot pins and said other pivots in conveyor driving engagement, said leading walls being higher than said bottom walls and projecting beyond the plane of the pivots connected to its own bucket, said leading walls being approximately planar from said bottom wall to its outer edge.

4. A bucket conveyor comprising:

a plurality of buckets having leading and trailing side walls connected by a bottom wall that is generally normal to said leading wall, said leading walls being about three times as high as said trailing walls, lateral end walls closing the ends of said buckets from the outer edge of said trailing walls to adjacent the outer edges of said leading walls, pivot bars extending across the trailing sides of said buckets and projecting laterally beyond said buckets, pivot pins secured to said end walls and projecting laterally outwardly therefrom intermediate of said leading and trailing walls with the line between said pivot bars and said pivot pins at an acute angle from the planes of said leading walls and at an obtuse angle from the planes of said trailing walls, forwardly turned flanges on the outer edges of said leading walls terminating outwardly of the planes defined by said pivot bars and pivot pins, and links pivotally connected between the pivot pins of each bucket and the pivot bars of the preceding bucket, said links being equal in length at their pivots to the distance between said pivot bars and said pivot pins.

5. A bucket conveyor comprising:

a plurality of buckets having outwardly divergent leading and trailing side walls connected by a bottom wall, said leading walls being higher than said trailing walls, lateral end walls closing the ends of said buckets, pivot bars extending across the trailing sides of said buckets and projecting laterally beyond said buckets, pivot pins secured to said end walls and projecting laterally outwardly therefrom intermediate of said leading and trailing walls with the line between said pivot bars and said pivot pins at an acute angle from the planes of said leading walls, forwardly turned flanges on the outer edges of said leading walls terminating outwardly of the planes defined by the pivot bars and pivot pins on the buckets, and links pivotally connected between the pivot pins of each bucket and the pivot bar of the preceding bucket, said links being equal in length at their pivots to the distance between said pivot bars and said pivot pins.

6. A bucket conveyor comprising:

a plurality of buckets having leading and trailing side walls connected by a bottom wall that is generally normal to said leading wall, said leading walls being higher than said trailing walls, lateral end walls closing the ends of said buckets, pivot bars secured to said buckets adjacent the trailing sides of the buckets and projecting laterally beyond said buckets, pivot pins secured to said end walls and projecting laterally outwardly therefrom intermediate of said leading and trailing walls with the line between said pivot bars and said pivot pins at an acute angle from the planes of said leading walls, forwardly turned flanges on the outer edges of said leading walls terminating outwardly of the planes defined by said pivot bars and pivot pins, and links pivotally connected between the pivot pins of each bucket and the pivot bars of the preceding bucket, said links being equal in length at their pivots to the distance between said pivot bars and said pivot pins.

7. A bucket conveyor comprising:

a plurality of buckets having leading and trailing side walls connected by a bottom wall, lateral end walls closing the ends of said buckets, pivot bars secured to said buckets adjacent the trailing sides of the buckets and projecting laterally beyond said buckets, pivot pins secured to said end walls and projecting laterally outwardly therefrom intermediate of said leading and trailing walls, forwardly turned flanges on the outer edges of said leading walls terminating outwardly of the planes defined by said pivot bars and pivot pins, and links pivotally connected between the pivot pins of each bucket and the pivot bars of the preceding bucket, said links being equal in length at their pivots to the distance between said pivot bars and said pivot pins.

8. A bucket conveyor comprising:

a plurality of buckets having leading and trailing side walls, lateral end walls closing the ends of said buckets, pivot bars secured to said buckets adjacent the trailing sides of said buckets and projecting laterally beyond said buckets, pivot pins secured to said end walls and projecting laterally outwardly therefrom intermediate of said leading and trailing walls with the line between said pivot bars and said pivot pins at an acute angle from the planes of said leading walls, reversely rearwardly then forwardly turned flanges on the outer edges of said leading walls terminating outwardly of the planes defined by said pivot bars and pivot pins, and links pivotally connected to the pivot pins and the pivot bars connecting said buckets in a chain, said links being equal in length at their pivots to the distance between said pivot bars and said pivot pins.

9. A conveyor comprising a series of successive buckets, said buckets having leading and trailing side walls connected by lateral end walls, first pivots connected to said end walls and projecting laterally outwardly from said end walls, other pivots connected to said end walls and projecting laterally outwardly from said end walls, said leading walls extending upwardly beyond said second pivots and having forwardly turned flanges overlying the trailing walls of preceding buckets, links pivotally connecting the leading and trailing pivots on adjacent buckets in chains of equally pitched pivots, the pitch position of said buckets in said series being an integral multiple of at least two times the pitch of said pivots, the leading and trailing walls of each bucket being angled relative to the plane of the pivots thereof to clear the walls of adjacent buckets in passing around said sprockets.

10. A conveyor comprising a series of successive buckets, said buckets having leading and trailing side walls connected by lateral end walls, first pivots connected to said buckets closely adjacent said trailing side walls and projecting laterally outwardly from said end walls, other pivots connected to said end walls and projecting laterally outwardly from said end walls, said leading walls extending upwardly beyond said second pivots and overlying the trailing walls of preceding buckets, links pivotally connecting the leading and trailing pivots on adjacent buckets in chains of equally pitched pivots, the pitch position of said buckets in said series being an integral multiple of at least two times the pitch of said pivots.

References Cited by the Examiner

UNITED STATES PATENTS 1,426,179  8/1922  Glass _____ 198—149 X

EVON C. BLUNK, *Primary Examiner.*

RICHARD E. AEGERTER, *Examiner.*